United States Patent

Moriki et al.

[15] 3,662,194
[45] May 9, 1972

[54] HIGH-VOLTAGE PIEZOELECTRIC TRANSFORMER HOUSED WITH DIODES

[72] Inventors: Juichi Moriki, 1-33 Chitosecho, Nishinomiya-shi; Teruo Itoh, 1-2, Matsushitacho; Masaharu Shiosaki, 6-23, Mizuo-2-chome, both of Ibaragi-shi; Yojin Maeda, 498, Aza Shimotahara, Shijonawatecho, Kitakawachi-gun; Hisataka Kuroki, 5-35, Sawaragihigashicho, Ibaragi-shi; Kenshiro Sumi, No. 807, Shinmachi-7-Jo-Jutaku, Higashishi-shiokojicho, Shinmachi-7-Jo-Sagaru, Shimokyo-ku, Kyoto; Hidekazu Shimura, 1-70, Higashimikunicho, Higashiyodogawa-ku, all of Japan

[22] Filed: July 8, 1970
[21] Appl. No.: 53,164

Related U.S. Application Data

[63] Continuation of Ser. No. 712,902, Mar. 11, 1968, abandoned.

[52] U.S. Cl. ............................. 310/9.4, 310/8.1, 310/8.9, 310/9.2, 310/9.8
[51] Int. Cl. ..................................................... H01v 7/00
[58] Field of Search ......................... 310/8.9, 9.1–9.4, 310/8.5, 8.2

[56] References Cited

UNITED STATES PATENTS

| 2,975,354 | 3/1961 | Rosen | 333/72 |
| 3,535,569 | 10/1970 | Clawson et al. | 310/9.2 |
| 2,717,372 | 9/1955 | Anderson | 310/9.4 |
| 2,523,701 | 9/1950 | Kuehl | 310/9.4 |
| 3,108,161 | 10/1963 | Tourtellot | 310/8.5 X |
| 3,313,891 | 4/1967 | Wood | 310/9.1 X |
| 3,495,103 | 2/1970 | Nakajima et al. | 310/9.1 |
| 2,575,819 | 11/1951 | Laird | 310/8.9 X |
| 2,484,428 | 10/1949 | Smith | 310/8.9 |
| 1,953,220 | 4/1934 | Giebe et al. | 310/8.9 |
| 2,440,064 | 4/1948 | Arnold et al. | 310/9.4 |

Primary Examiner—J. D. Miller
Assistant Examiner—Mark O. Budd
Attorney—Stevens, Davis, Miller & Mosher

[57] ABSTRACT

A support structure for a piezoelectric transformer of the kind operable in accordance with the λ-mode, which supports the piezoelectric transformer at the node of minimum displacement of the drive section of the transformer and is an electrical conductor so that it serves also as a lead wire. An assembly including the piezoelectric transformer, the support structure and a rectifier element is housed in a casing or enclosed in an envelope made vacuous or filled with an insulating gas so that it is usable as a high-voltage generator for television receivers.

7 Claims, 12 Drawing Figures

PATENTED MAY 9 1972

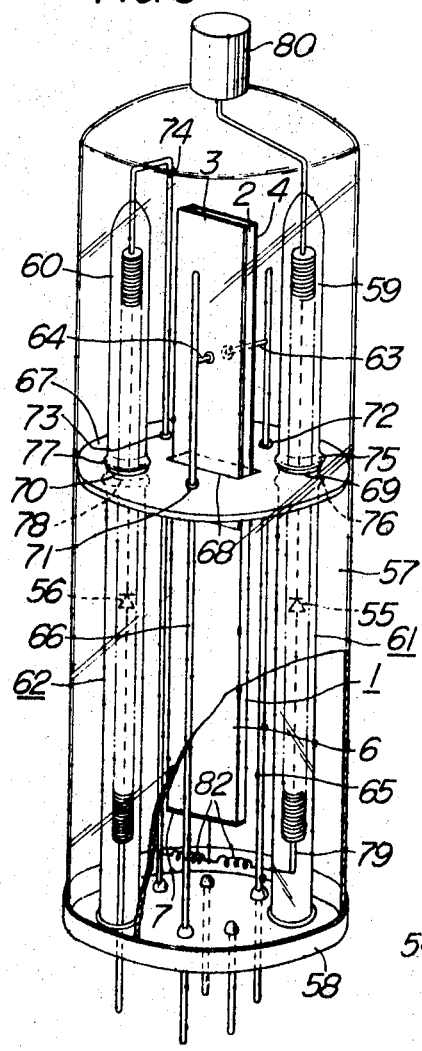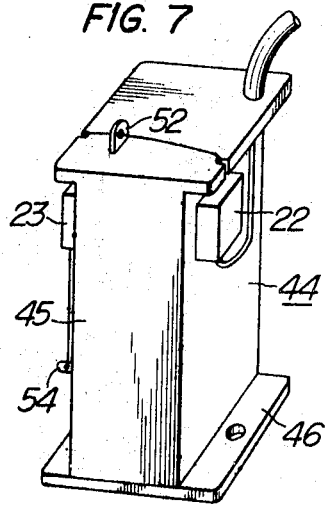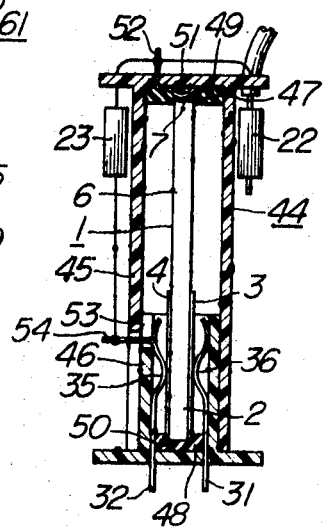

HIGH-VOLTAGE PIEZOELECTRIC TRANSFORMER HOUSED WITH DIODES

CROSS-REFERENCE TO RELATED APPLICATION

This application is a continuation application of the U.S. Ser. No. 712,092 filed Mar. 11, 1968, now abandoned.

BACKGROUND OF THE INVENTION

1. Field of the Invention

This invention relates to high-voltage generating apparatus for use in television receivers.

In television receivers, a high voltage in the order of 10,000 to 15,000 volts is generally required in order to make the cathode-ray tube luminant. Modern television receivers employ a fly-back transformer for the generation of such a high voltage. The fly-back transformer is based on the principle of the winding-type transformer and has several thousand turns of very fine copper wire having a diameter in the order of 0.1 mm. wound around a ferrite core, the transformer structure being subjected to an electrical insulation treatment so as not to give rise to an objectionable dielectric breakdown under such a high voltage. The fly-back transformer is thus quite complex in shape and has a relatively large size and weight.

It is therefore very attractive to eliminate the winding from such a transformer, that is, to realize a winding-less transformer for generating a high voltage required for television receivers. To this end, a novel principle must be found which replaces the conventional method in which the electro-magneto-electrical energy conversion is resorted to for the desired voltage conversion.

2. Description of the Prior Art

With the advent of ceramic piezoelectric materials, a novel idea has been conceived which utilizes the piezoelectric effect of such a material to achieve the desired voltage conversion by means of an electro-mechano-electrical conversion of energy. It is the piezoelectric transformer that has come out of the above concept. The piezoelectric transformer was first proposed by C.A. Rosen et al., and disclosed in U.S. Pat. No. 2,830,274, in which C.A. Rosen et al., proved that the piezoelectric transformer according to their invention was very useful high-voltage generating apparatus. Although, since then, some sort of experiments and theoretical analysis have been exercised in order to verify the principle of the piezoelectric transformer, the piezoelectric transformer has not yet been put into practical use due to various technical problems involved therein.

SUMMARY OF THE INVENTION

It is the principal object of the present invention to solve the various technical problems and provide a high-voltage generating apparatus for television receivers employing such a piezoelectric transformer.

It is an object of the present invention to provide a high-voltage generating apparatus employing a piezoelectric transformer of the type operable in accordance with the λ-mode, which is provided with a support structure for rigidly supporting the piezoelectric transformer without interfering in any way with the proper operation of the piezoelectric transformer.

Another object of the present invention is to provide a high-voltage generating apparatus of the kind described above in which support rods which serve also as electrode leads are used to rigidly support the piezoelectric transformer.

A further object of the present invention is to provide a high-voltage generating apparatus of the kind described above in which the piezoelectric transformer and a rectifier for rectifying the output of the piezoelectric transformer are housed in a casing in a highly electrically insulated relation from each other.

Other objects, features and advantages of this invention will become apparent from the following description taken in conjunction with the accompanying drawings.

BRIEF DESCRIPTION OF THE DRAWING

FIG. 2b is a perspective view of the piezoelectric transformer shown in FIG. 2a;

FIG. 7 is a perspective view of a further embodiment of the present invention;

FIG. 8 is a partly sectional elevational view of the apparatus shown in FIG. 7;

FIG. 9 is a perspective view of a still another embodiment of the present invention.

DESCRIPTION OF THE PREFERRED EMBODIMENTS

Figure 1:
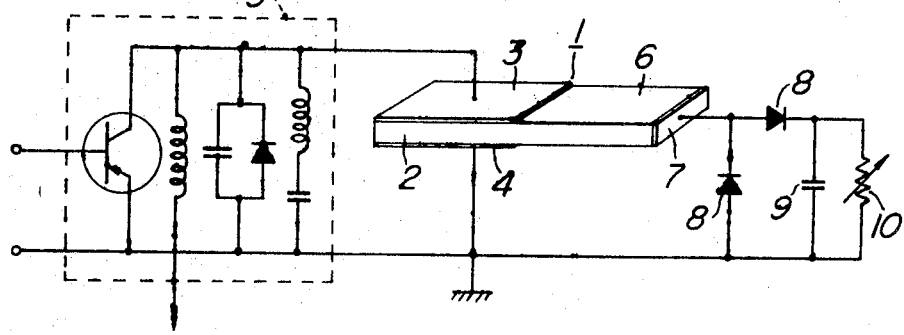
FIG. 1 is a circuit diagram of a high-voltage generating apparatus for a television receiver employing a piezoelectric transformer.

Referring first to FIG. 1, the circuit of a high-voltage generating apparatus employing a piezoelectric transformer will be described. The piezoelectric transformer 1 is made from a piezoelectric ceramic material such as barium titanate, PZT ceramic, or PCM ceramic (consisting, for example, essentially of $Pb(Mg_{1/3}Nb_{2/3})O_3$, $PbTiO_3$ and $PbZrO_3$), and comprises a drive section 2 and a generator section 6. The drive section 2 is provided with opposite electrodes 3 and 4 and is polarized in the direction of its thickness. The generator section 6 has an electrode 7 at its right-hand or output end and is polarized in the direction of its length. The electrodes 3 and 4 in the drive section 2 are connected to a horizontal output circuit 5, while the electrode 7 in the generator section 6 is connected through rectifying diodes 8 and a smoothing capacitor 9 to a load resistor 10.

Figure 2A:
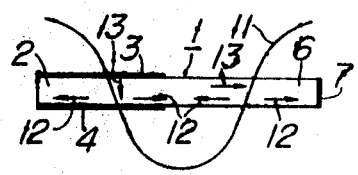
FIG. 2a is a diagrammatic illustration of the operating mode of a piezoelectric transformer employed in the high-voltage generating apparatus according to the present invention.
Figure 2B:
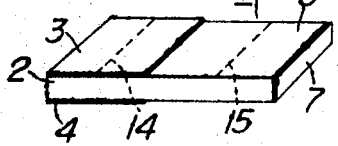

In operation, when a fly-back pulse from the horizontal output circuit 5 is applied across the drive electrodes 3 and 4, the electrical energy is converted into a mechanical energy by the electrostrictive effect with the result that the entire bar is caused to mechanically vibrate. A resonance occurs in the direction of the length of the bar at a specific frequency which is determined by the length of the bar and the vibration propagation velocity proper to the material, and as a result, a standing wave appears which has an amplitude relative to the stress and strain which results in a vibratory displacement as shown in FIG. 2a. The strain amplified by the resonance produces a piezoelectric effect in the right-hand half of the bar, that is, in the generator section 6 with the result that a potential difference appears across the generator electrode 7 and the ground. In this manner, a step-up AC voltage of considerable magnitude can be obtained. When such an A.C. voltage is rectified by the diode 8 and is then smoothed out by the capacitor 9, a high DC voltage can be obtained across the load resistor 10.

The use of a piezoelectric transformer in a high-voltage generating apparatus in the above manner has heretofore been known in the art, but how to support such a piezoelectric transformer for the practical application thereof has not been considered at all. The present invention contemplates the provision of effective and useful means for supporting the piezoelectric transformer thereby offering a practically usable high-voltage generating apparatus of the kind described above.

The present invention utilizes a piezoelectric transformer 1 which is adapted to operate with a vibration mode of the type shown in FIG. 2a. The piezoelectric transformer 1 having a drive section 2 and a generator section 6 resonates according to the λ-mode and the magnitude of vibratory displacement thereof is shown by the reference numeral 11. The relative direction of vibration of the drive section 2 and the generator section 6 is shown by the arrows 12, and the piezoelectric transformer 1 is polarized in a direction as shown by the arrow 13. The reference numerals 14 and 15 designate the modes of minimum displacement in the respective sections 2 and 6, that is, theoretically the displacement is zero at these modes.

Figure 3:
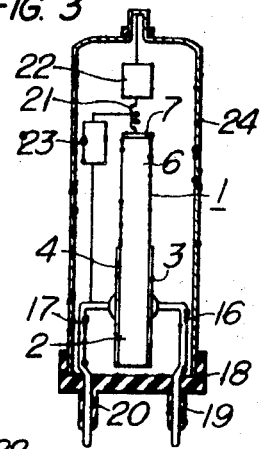
FIG. 3 is a partly sectional elevational view of an embodiment of the present invention.
Figure 4:
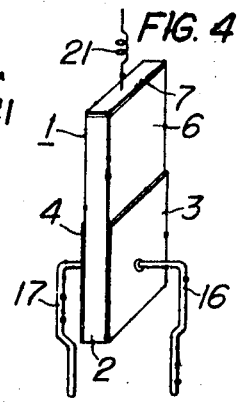
FIG. 4 is a perspective view of a part of the apparatus shown in FIG. 3.

Referring to FIGS. 3 and 4 illustrating an embodiment of the present invention, a pair of support rods 16 and 17 of electrica conductor having a diameter in the order of 0.5 to 2.5 mm. are soldered to a point on the opposite faces of the drive section 2 of the piezoelectric transformer 1 in such a manner that the opposite points lie at the node of minimum displacement as shown. The support rods 16 and 17 are so arranged as to serve simultaneously as electrical leads for the piezoelectric transformer 1 as seen in FIGS. 3 and 4. More precisely, the support rods 16 and 17 in the embodiment shown herein are in the form of a Dumet wire having a diametrr of 1.0 mm. and are soldered at their upper end to the above-specified position of the drive section 2. The support rods 16 and 17 have their lower end portions extending into respective apertures 19 and 20 in a socket 18 to be fixedly received therein, and their tip portions project out of the socket 18 to work as the leads. A rectifier element 22 is connected at one end to the generator electrode 7 by way of a spring 21, and a rectifier element 23 is connected between an intermediate point of the spring 21 and the support rod 17. The piezoelectric transformer 1 provided with the elements described above is hermetically sealingly enclosed in a glass bulb 24. A lead extends from the other end of the rectifier element 22 through the head portion of the bulb 24 to serve as an output terminal.

A piezoelectric transformer serving as a high-voltage power supply for a television receiver is a heavy, elongated and considerably large-sized unit and is arranged to operate with a large amplitude. Therefore, the piezoelectric transformer must be mechanically rigidly and positively supported and the support structure therefor must neither interfere with free vibration of the transformer nor cause any reduction or fluctuation of the output voltage. Furthermore, occurrence of an undesirable spurious vibration must be avoided. Moreover, in order to enhance the reliability of the piezoelectric transformer, The support structure therefor must be such that an unusual mechanical stress may not be concentrated on the piezoelectric element.

These requirements are satisfied by the support structure according to the present invention since it can sufficiently rigidly support the elongated and heavy piezoelectric transformer 1 and the use of a conductor wire of relatively large diameter as the support rods 16 and 17 obviates occurrence of an undesirable spurious vibration of the lead wires thereby suppressing occurrence of any spurious resonance. Furthermore, any reduction or fluctuation of the output voltage of the piezoelectric transformer 1 can utterly be eliminated by virtue of the fact that the piezoelectric transformer 1 which operates in accordance with the λ-mode is supported at opposite points lying on the node of minimum displacement of the drive section 2. An undesirable reduction in the output take place if the piezoelectric transformer 1 is supported at portions other than the points lying on the node of minimum displacement of the drive section 2 as well as the generator section 6. Supporting the piezoelectric transformer 1 at its generator section 6 by means of support rods of an electrical conductor is especially objectionable because a surface leakage or discharge tends to take place between the output terminal and the support rods. In this respect, absence of any unnecessary support at the generator section 6 in accordance with the present invention eliminates the occurrence of undesirable surface leakage and discharge and thus obviates an undesirable variation of the resonance frequency due to stray capacitance. Moreover, the point support arrangement employed for supporting the piezoelectric transformer 1 obviates concentration of unusual mechanical stress and hence eliminates the possibility of damage to the piezoelectric transformer 1, thus lending itself to the desired production of a highly reliable piezoelectric transformer unit. A more rigid support may be achieved by supporting a piezoelectric transformer 1 at a plurality of points on the node of minimum displacement.

Figure 5:
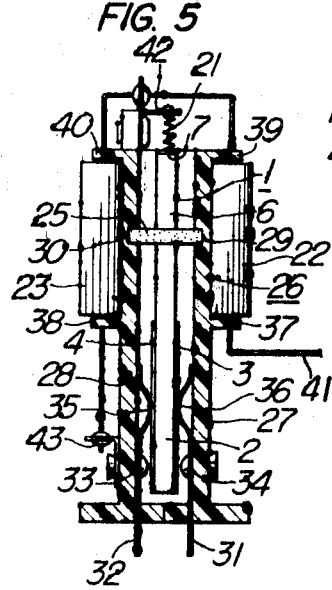
FIG. 5 is a partly sectional elevational view of another embodiment of the present invention.
Figure 6:
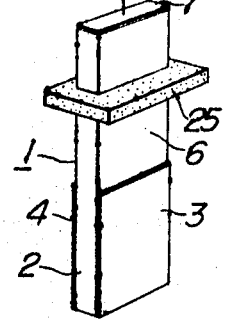
FIG. 6 is a perspective view of part of the apparatus shown in FIG. 5.

In another embodiment of the present invention shown in FIGS. 5 and 6, a support member 25 of a resilient material such as rubber or a soft and pliable plastic surrounds the generator section 6 of the piezoelectric transformer 1 and lies on the node of minimum displacement as seen in FIG. 6. The support member 25 is secured to the piezoelectric transformer 1 by a baking process, a molding process, a cementing process or any other suitable process. A spring 21 is connected to the generator electrode 7 in the generator section 6. The piezoelectric transformer 1 having the support member 25 and the spring 21 mounted thereon is supported within a casing 26 in such a manner as shown in FIG. 5. The casing 26 is composed essentially of a pair of opposed mounting plates 27 and 28 which have opposite recesses 29 and 30 in their inner walls, respectively. Opposite end edges of the support member 25 secured to the piezoelectric transformer 1 are snugly fitted in these recesses 29 and 30 so as to firmly mount the piezoelectric transformer 1 within the casing 26. A pair of support springs 31 and 32 are securely fixed to the opposite lower inside faces of the mounting plates 27 and 28 by set screws 33 and 34, respectively. These support springs 31 and 32 have respective convex portions 35 and 36 which bear against the drive section 2 at the node of minimum displacement 14. The support springs 31 and 32 have their lower end portions projected outwardly from the lower end of the casing 26 to serve as input terminals.

Flanges 37 and 39 extend outwardly from the outer wall surface of the mounting plate 27, while similar flanges 38 and 40 extend outwardly from the outer wall surface of the mounting plate 28 so as to define therebetween opposite spaces in which rectifier elements 22 and 23 for rectifying a high voltage generated by the piezoelectric transformer 1 are mounted as shown. A rectifier output lead wire 41 is connected to the rectifier element 22. A junction terminal 42 connects the rectifier elements 22 and 23 with the spring and output lead wire 21 of the piezoelectric transformer 1. A terminal strip 43 is mounted on the set screw 33 so as to connect the rectifier element 23 with the support spring 32 by way of a lead wire.

It will be understood that the resilient member of rubber or like material secured to a part of the piezoelectric transformer 1 by means of baking, molding, cementing or any other suitable process provides a mechanically rigid support for the piezoelectric transformer 1. Furthermore, by virtue of the fact that the piezoelectric transformer 1 which operates in accordance with the λ-mode is supported by the resilient member at the node of minimum displacement 15, an undesirable reduction or fluctuation of the output voltage does not occur. Moreover, the piezoelectric transformer 1 can make unobstructed vibration since the support member is made from a resilient material. In addition, the employment of the resilient support member is quite effective for the suppression of any spurious vibration that might occur between the supporting portion of the casing 26 and the piezoelectric transformer 1, and for the elimination of concentration of mechanical stress on the piezoelectric transformer 1 with the resultant complete freedom from damage to the piezoelectric electric transformer 1. Therefore, the piezoelectric transformer 1 can be sufficiently protected against external impact and can operate with high reliability. Furthermore, the support springs 31 and 32 supporting the piezoelectric transformer 1 at the other node of minimum displacement by their convex portions 35 and 36 provide an additional effect of a safer support for the relatively elongated and heavy piezoelectric transformer 1. Since the exposed portions of the support springs 31 and 32 can serve as the input terminals, the piezoelectric transformer structure may, for example, be arranged for mounting on a printed circuit.

In a further embodiment of the present invention shown in FIGS. 7 and 8, the piezoelectric transformer 1 is housed within a casing 44 composed of an upper casing section 45 and a lower casing section 46. The upper casing section 45 is arranged to snugly fit over the lower casing section 46, and these sections are made from an electrically insulating material. Resilient support members 47 and 48 of rubber or like resilient material are disposed within the casing 44 at the upper inner end of the upper casing section 45 and the lower inner end of the lower casing section 46, respectively. The resilient support members 47 and 48 have respective recesses 49 and 50 for snugly receiving therein the upper and lower ends of the piezoelectric transformer 1. As in the case of the embodiment shown in FIGS. 5 and 6, two support springs 31 and 32 having respective convex portions 35 and 36 are provided to support the drive section 2 at the node of minimum displacement 14 thereof. The support springs 31 and 32 are fixed adjacent the lower end thereof in the bottom plate portion of the lower casing section 46, with each tip portion projecting outwardly from the casing 44 to serve as an input lead. The generator electrode 7 of the piezoelectric transformer 1 bears against a thermal strip 51 mounted on the inner face of the cover plate portion of the upper casing 45, with one end 52 of the terminal strip 51 projecting outwardly from the upper casing section 45 to be connected by a lead with one end of rectifier elements 22 and 23. The other end of the rectifier element 23 is connected by a lead with a portion 54 of the support spring 32 which projects outwardly from the casing 44 through an opening 53 bored in the walls of the upper and lower casing sections 45 and 46.

It will be understood that the piezoelectric transformer 1 can be rigidly supported by the resilient support members 47 and 48 as well as by the support springs 31 and 32, and the desired safety against high voltage can be ensured by the fact that the end portion of the support springs 31 and 32 serving also as the input lead wire and the end portion 52 of the terminal strip 51 solely project outwardly from the casing 44 of electrically insulating material, and the piezoelectric transformer 1 is completely covered by the insulating casing 44.

A still further embodiment shown in FIG. 9 relates to a high-voltage generating apparatus of air-tight structure. In the operation of the piezoelectric transformer in air, such factors as the dielectric breakdown voltage of air, attachment of dust, and moisture in the air must be taken into consideration, while in order to avoid discharge from the piezoelectric transformer, there must be a sufficiently large insulation gap between the piezoelectric transformer and the ground as well as between the piezoelectric transformer and other parts of the apparatus. Furthermore, in order to derive a rectified DC output from the apparatus, a rectifier circuit must be connected to the output terminal of the piezoelectric transformer, and discharge from such a rectifier circuit must also be taken into consideration. In view of the above requirements, the high-voltage generating apparatus as a whole must inevitably have a large size, which is a drawback that is unacceptable.

As a remedy to overcome the above drawback, the present embodiment employs a structure as shown in FIG. 9. More precisely, the piezoelectric transformer 1 of ceramic piezoelectric material and two semiconductor high-voltage rectifier elements 55 and 56 are enclosed within a hermetically closed envelope 57 such as a glass tube as seen in FIG. 9 and the interior of the envelope 57 is filled with a gaseous electrically insulating material having a high dielectric breakdown voltage. The preferably employed insulating material could be sulfur hexafluoride ($SF_6$) in gaseous form whose dielectric constant is 1.00191, whose dielectric strength is 2.35 times as much as that of air, and which has an excellent cooling function. The sulfur hexafluoride gas is filled within the envelope 57 at a pressure at least higher than one atmosphere. A mounting base 58 is mounted in the lower end of the envelope 57 to sealingly close that end, and two glass tubes 59 and 60 are fusion welded to the mounting base 58. The glass tubes 59 and 60 contain therein the semiconductor high-voltage rectifier elements 55 and 56 to constitute semiconductor high-voltage rectifier units 61 and 62, respectively.

Meanwhile, electrode leads 63 and 64 are fusion welded at one end to the input terminals of the piezoelectric transformer 1, that is, at opposite points lying on the node of minimum displacement of the drive section 2 and are connected at the other end with respective support rods 65 and 66, which are mounted in the mounting base 58 and project outwardly from the latter. The support rods 65 and 66 are made from an electrical conductor and thus serve also as a lead wire. A sheet of mica 67 having a high insulation is disposed within the envelope 57 and has a central perforation 68 for receiving therein the middle portion of the piezoelectric transformer 1 in order to maintain the latter in proper position. The central perforation 68 is so sized as will not interfere with free vibration of the piezoelectric transformer 1. The mica sheet 67 is further provided with perforations 69, 70, 71, 72 and 73 through which the semiconductor high-voltage rectifier units 61 and 62, the support rods 65 and 66, and a lead 74 connected to the upper end of the semiconductor high-voltage rectifier unit 62 penetrate, respectively. The glass tubes 59 and 60 forming the shell of the semiconductor high-voltage rectifier units 61 and 62 have respective spaced projections 75, 76 and 77, 78 for positively securing the mica sheet 67 in place. The mica sheet 67 which is positively secured in place in this manner ensures a reliable support for the piezoelectric transformer 1, the semiconductor high-voltage rectifier units 61 and 62, the support rods 65 and 66, and the electrode lead 74 within the envelope 57. An electrode lead 79 having a spring means 82 is employed to connect the output terminal of the piezoelectric transformer 1 to the input terminal of the semiconductor high-voltage rectifier unit 61. The provision of the spring means 82 as a part of the electrode lead 79 aims at permitting the free vibration of the piezoelectric transformer 1 without any interference. The DC output voltage obtained by rectifying the output voltage of the piezoelectric transformer 1 by the semiconductor high-voltage rectifier units 61 and 62 is led outwardly through an external terminal 80.

Figure 10:
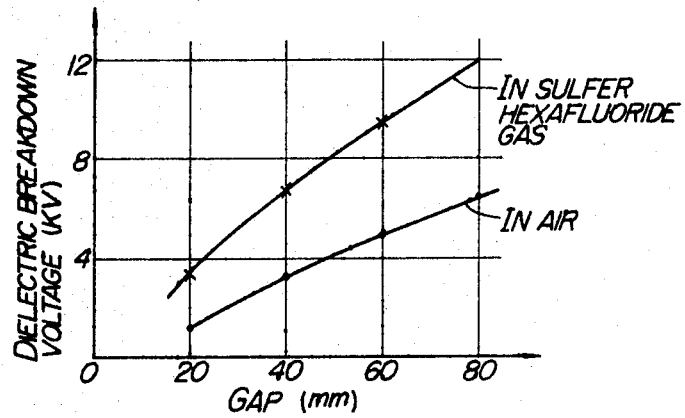
FIGS. 10 and 11 are graphic representations of the operating characteristics of the apparatus shown in FIG. 9.

It will be understood that, by virtue of the structure in which the piezoelectric transformer 1 and the semiconductor high-voltage rectifier units 61 and 62 for rectifying the output voltage of the piezoelectric transformer 1 are enclosed within the envelope 57 filled with the gaseous insulating material, the dielectric strength of both these elements can remarkably be improved and discharge therebetween can be thereby avoided. Since the piezoelectric transformer 1 can thereby be disposed in close proximity to the high-voltage rectifier units 61 and 62, the high-voltage generating apparatus as a whole can be made quite compact and small in size thus facilitating the handling thereof, and a rectified DC voltage can readily be derived from the high-voltage generating apparatus. Complete protection against dust, moisture and the like is another advantage of the structure in which the envelope 57 sealingly contains therein the piezoelectric transformer 1 and the semiconductor high-voltage rectifier units 61 and 62. Furthermore, the use of the gaseous insulating material having a cooling function in itself provides a further advantage of reducing the undesirable temperature rise of the piezoelectric transformer 1 to a substantial degree and hence minimizing the objectionable variation in the operating characteristics of the piezoelectric transformer 1 due to temperature rise. The dielectric breakdown voltage in the gaseous sulfur hexafluoride ($SF_6$) is compared with that in air and the result is shown in FIG. 10, from which it will be seen that the sulfur hexafluoride gas is remarkably excellent compared with air in this respect.

Figure 11:
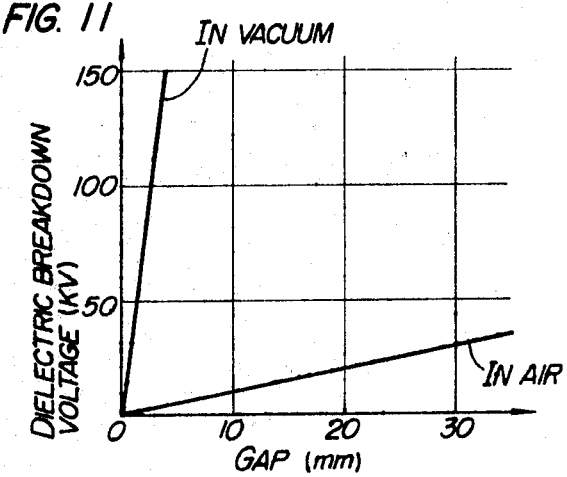

The interior of the envelope 57 may be made vacuous in lieu of filling it with sulfur hexafluoride gas. In this case, as seen in FIG. 11, test results to seek the relation between the dielectric breakdown voltage and the gap between the piezoelectric transformer 1 and the semiconductor high-voltage rectifier units 61 and 62 in air and in vacuum under application of a uniform electric field prove that the dielectric breakdown voltage is higher in vacuum than in air. Therefore, the piezoelectric transformer 1 can be disposed in close proximity to the semiconductor high-voltage rectifier units 61 and 62 when they are placed in a vacuum. Complete protection against dust, moisture and the like is another advantage of the arrangement in which the vacuum envelope 57 sealingly contains therein the piezoelectric transformer 1 and the semiconductor high-voltage rectifier units 61 and 62. A further advantage is a sound-proof effect since the vibration sound produced during the vibration of the piezoelectric transformer 1 at a high frequency would not emit outwardly because of the vacuum prevailing within the envelope 57.

Although, in the above embodiments, the piezoelectric transformer is shown as having the shape of a parallelepiped, it may take any other suitable shape including a cylindrical shape.

What is claimed is

1. A high voltage generating apparatus comprising a rectangular parallelopiped piezoelectric transformer having a generator section and a drive section, said generator section having an output electrode at one end thereof, said drive section having input electrodes on the opposite faces thereof; conductive supporting members secured at one end to said input electrodes at a node of minimum displacement of said drive section and served as lead conductors, the other end of said supporting members projecting out of mounting means therefor; a first rectifier element connected between said output electrode and one of said conductive supporting members; a second rectifier element, one terminal thereof connected with said output electrode; a shielding casing made of insulating material housing said rectifier elements and said piezoelectric transformer; means for connecting a second terminal of said second rectifier element with an output terminal provided on said casing; and wherein said casing is substantially filled with a gaseous electrically insulating material.

2. A high voltage generating apparatus, comprising: a rectangular parallelopiped piezoelectric transformer having a generator section and a drive section, said generator section having an output electrode at one end thereof, said drive section having input electrodes on the opposite faces thereof; a resilient body surrounding and secured to the periphery of said transformer at the node of minimum displacement of vibration of said generator section; a shielding casing made of insulating material housing said piezoelectric transformer; means for mounting said resilient body to said casing; conductive resilient supporting rods extending through the wall of said casing, said rods having convex portions which bear against said input electrodes at positions corresponding to the node of minimum displacement of vibration of said drive section; wherein said transformer is suspended in said casing and supported by said resilient body and said portions of said rods which bear against said transformer.

3. A high voltage generating apparatus comprising a rectangular parallelopiped piezoelectric transformer having a generator section provided with an output electrode at one end thereof and a drive section provided with input electrodes on the opposite faces thereof; a pair of resilient members supporting the opposite ends of said piezoelectric transformer; and a pair of conductive supporting rods having convex portions and serving as input lead conductors, said rods resiliently supporting said piezoelectric transformer with their convex portions which bear against said input electrodes at positions corresponding to the node of minimum displacement of said drive section.

4. A high voltage generating apparatus comprising a rectangular parallelopiped piezoelectric transformer having a generator section provided with an output electrode at one end thereof and a drive section provided with input electrodes on the opposite faces thereof; an envelope of an insulating material housing therein said transformer; a pair of resilient support members respectively disposed within said envelope at the upper and lower ends thereof and having recesses for snugly receiving the opposite ends of said piezoelectric transformer respectively; a pair of conductive supporting springs having respective bent portions bearing against said input electrodes at the node of minimum displacement of vibration of said drive section for serving as input lead conductors and supporting said transformer; and an external lead conductor passing through one of said resilient members for connection with said output electrode.

5. A high voltage generating apparatus comprising a rectangular parallelopiped piezoelectric transformer, one-half of which comprises a generator section and the other half comprising a drive section, said generator section having an output electrode at one end thereof and said drive section having input electrodes on the opposite faces thereof; a cylindrical shielding casing filled with inert gas for housing said transformer; two rectifier elements housed together with said transformer in said casing and disposed in parallel with said transformer; a sheet member having two perforations for attaching said rectifier elements therethrough in place and an opening for receiving therethrough said transformer; and conductive supporting members respectively secured to said input electrodes at the node of minimum displacement of vibration of said drive section and serving as electrical lead conductors thereto.

6. A high voltage generating apparatus, comprising: a rectangular parallelopiped piezoelectric transformer having a generator section and a drive section, said generator section having an output electrode at one end thereof and said drive section having input electrodes on the opposite faces thereof; a shielding casing of insulating material housing said piezoelectric transformer; conductive supporting rods extending through said casing; means connecting said supporting rods to said input electrodes at positions corresponding to the node of minimum displacement of vibration of said drive section, wherein said transformer is suspended within said casing between at least a portion of said conductive rods; first and second rectifier elements housed in said casing and disposed in substantially parallel arrangement with the longitudinal axis of said transformer; means electrically connecting one terminal of said first rectifier element with said output electrodes; means connecting a second terminal of said first rectifier element with an external terminal of said casing; and means connecting said second rectifier element to said output electrode.

7. A high voltage generating apparatus according to claim 6, further comprising: supporting means securely supporting said first and second rectifier elements and said conductive supporting rods in said casing, said supporting means including a circular member of an insulating material having a plurality of openings through which said rectifier elements, said conductive rods and said transformer pass, said circular member not interfering with the free vibration of said transformer.

* * * * *

PO-1050
(5/69)

UNITED STATES PATENT OFFICE
CERTIFICATE OF CORRECTION

Patent No. 3,662,194      Dated May 9, 1972

Inventor(s) JUICHI MORIKI et al

It is certified that error appears in the above-identified patent and that said Letters Patent are hereby corrected as shown below:

On the title page add the following:

[30] Foreign Application Priority Data

Dec. 28, 1967    Japan .... 77/68

In line [63] of the title page, the Serial Number should read -- 712,092 --.

Signed and sealed this 31st day of October 1972.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,662,194            Dated May 9, 1972

Inventor(s) Juichi MORIKI et al

It is certified that error appears in the above-identified patent and that said Letters Patent are hereby corrected as shown below:

The assignee was omitted from the Letters Patent and should read

-- Matsushita Electric Industrial Co., Ltd. --

Signed and sealed this 17th day of April 1973.

(SEAL)
Attest:

EDWARD M. FLETCHER, JR.            ROBERT GOTTSCHALK
Attesting Officer                    Commissioner of Patents